(12) United States Patent
Meyer (10) Patent No.: US 7,469,585 B2
(45) Date of Patent: Dec. 30, 2008

(54) MINIATURE FREEFALL MECHANISM

(75) Inventor: Thomas J. Meyer, Marilla, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 213 days.

(21) Appl. No.: 11/559,378

(22) Filed: Nov. 13, 2006

(65) Prior Publication Data

US 2008/0110258 A1 May 15, 2008

(51) Int. Cl.
*G01V 7/14* (2006.01)
(52) U.S. Cl. ................... 73/382 R; 73/382 G
(58) Field of Classification Search ............... 73/382 R, 73/382 G
See application file for complete search history.

(56) References Cited

U.S. PATENT DOCUMENTS 3,727,462 A * 4/1973 Stone et al. ............... 73/382 R
5,892,151 A   4/1999 Niebauer et al.

* cited by examiner

*Primary Examiner*—John E Chapman
(74) *Attorney, Agent, or Firm*—DeMont & Breyer, LLC (57) ABSTRACT

A system for measuring differential gravity at two points is disclosed. In the illustrative embodiment, the system uses a pair of graspers which each repeatedly grasp, raise, and drop a test mass. The accelerations of the two free-falling test masses are monitored using optical interferometry. An output signal is provided that is based on a differential acceleration of the two test masses.

20 Claims, 7 Drawing Sheets

MINIATURE FREEFALL MECHANISM

CROSS REFERENCE TO RELATED APPLICATIONS

The underlying concepts, but not necessarily the language, of the following case is incorporated by reference: U.S. Pat. No. 5,892,151, issued 6 Apr. 1999. If there are any contradictions or inconsistencies in language between this application and one or more of the cases that have been incorporated by reference that might affect the interpretation of the claims in this case, the claims in this case should be interpreted to be consistent with the language in this case.

FIELD OF THE INVENTION

The present invention relates to gravimeters in general, and, more particularly, to differential gravimeters.

BACKGROUND OF THE INVENTION

A differential gravimeter measures a gravity variation between two locations. In addition, multiple differential gravimeters can be used to develop a three-dimensional map of gravity. Such 3-D mapping has been proposed in order to monitor fluid flow in-situ in subterranean reservoirs, such as an oil field. In order to be used in an in-situ underground application, however, the gravity sensors of a gravimeter must be directly insertable into boreholes of the oil field. As a result, the gravity sensors must be small and robust.

Since the differences in gravity across an oil field are typically very slight, the gravimeter must be extremely sensitive; sensitivity below 1 micro-Galileo is often necessary. Such extreme sensitivity, however, requires very high immunity to noise sources. Error can be introduced into the output signal of a gravimeter from noise sources such as electromagnetic interference, horizontal components in the acceleration of a free-falling mass, mechanical misalignment of sub-components, mechanical shock, and Coriolis forces that arise due to the rotation of the Earth.

Gravimeters have been developed that are based on the principle of balancing the weight of a fixed mass with forces from a normal or superconducting spring. Gravimeters such as these, however, have gravity sensors that are typically too large to be inserted into a borehole of an oil well. They are also difficult to setup and calibrate. In addition, they are sensitive to environmental influences such as temperature and vibration.

More recently small gravimeters have been developed that include gravity sensors specifically designed for direct insertion into a borehole. These small gravimeters utilize piezoelectric launchers to vertically launch a pair of test masses upward so that they can subsequently free-fall downward. An interferometer arrangement is used to monitor the acceleration of their falling masses after each reaches its apex. In addition to some of the drawbacks of other prior-art gravimeters, however, noise due to shock and vibration caused by their piezoelectric launchers limits the sensitivity of these gravimeters.

There exists a need, therefore, for a gravimeter that avoids or mitigates some or all of the problems associated with prior-art gravimeters.

SUMMARY OF THE INVENTION

The present invention provides a differential gravity measurement system. Some embodiments of the present invention are particularly well-suited for monitoring oil flow in subterranean oil fields. In particular, the illustrative embodiment of the present invention uses a pair of optically-interrogated, free-falling test masses in a Michelson interferometer arrangement to provide a highly sensitive measurement of the difference in gravity at two locations.

In the illustrative embodiment, the gravimeter comprises an interferometer and two gravity sensors that are optically interrogated as part of an interferometer arrangement. Each gravity sensor comprises a mass dropper, which includes a grasper and a test mass, and a gimbal for orientating of the mass dropper to vertical. Each grasper is mechanically-coupled to an actuator that moves it from a first position, wherein the grasper passively grasps the test mass, to a second position, wherein the grasper passively releases the test mass thereby allowing it to free-fall. A processor synchronizes the release of the test masses by their respective graspers. An optical beam is reflected off of each of the two falling test masses as they fall. These two optical paths compose the reference and test legs of the interferometer arrangement. The output signal of the interferometer is based on a difference in the path lengths of these optical beams; therefore, the output signal of the interferometer is a function of the difference in the local gravity that acts on each test mass.

Some embodiments of the invention comprise a tilt sensor that provides a feedback signal used to minimize the tilt of the mass dropper. Some embodiments of the invention comprise a rotation sensor to provide a signal based on a rotation of the test mass as it falls. This signal is used to provide a post-drop correction for mitigating the effects on the gravity sensor due to component misalignment, residual tilt of the mass dropper, effects from the rotation of the earth, and the like.

An embodiment of the present invention comprises: (1) a mass dropper comprising; (i) a first test mass; (ii) a grasper, wherein the grasper grasps the first test mass when in a first position, and wherein the grasper releases the first test mass when in a second position; and (iii) an actuator for moving the grasper on a path that includes the first position and the second position; and a sensor for providing a first signal based on an orientation of the mass dropper with respect to vertical; and (2) a gimbal for controlling the orientation of the mass dropper.

DETAILED DESCRIPTION

Full-field differential gravity monitoring for modeling the fluid distribution in an oil field can be achieved by means of mapping the relative gravity across the area of an oil field. An effective method for mapping the relative gravity is the application of double differences to detect gravity changes.

In this method the differential gravity is measured at a plurality of points, referenced to a base location. These differential gravity measurements are used to develop a full-field gravity image versus time, beginning with an initial image at time, t=0. Changes in oil distribution in the oil field can be determined by comparing subsequent images either by referencing each to the initial image, or by comparing sequential images. In order to minimize random errors, each image may include an average of tens or hundreds of individual measurements between set of two points. Each set of points, comprising the differential gravity measurement between two points, can be obtained by means of a differential gravimeter in accordance with the present invention.

Figure 1:
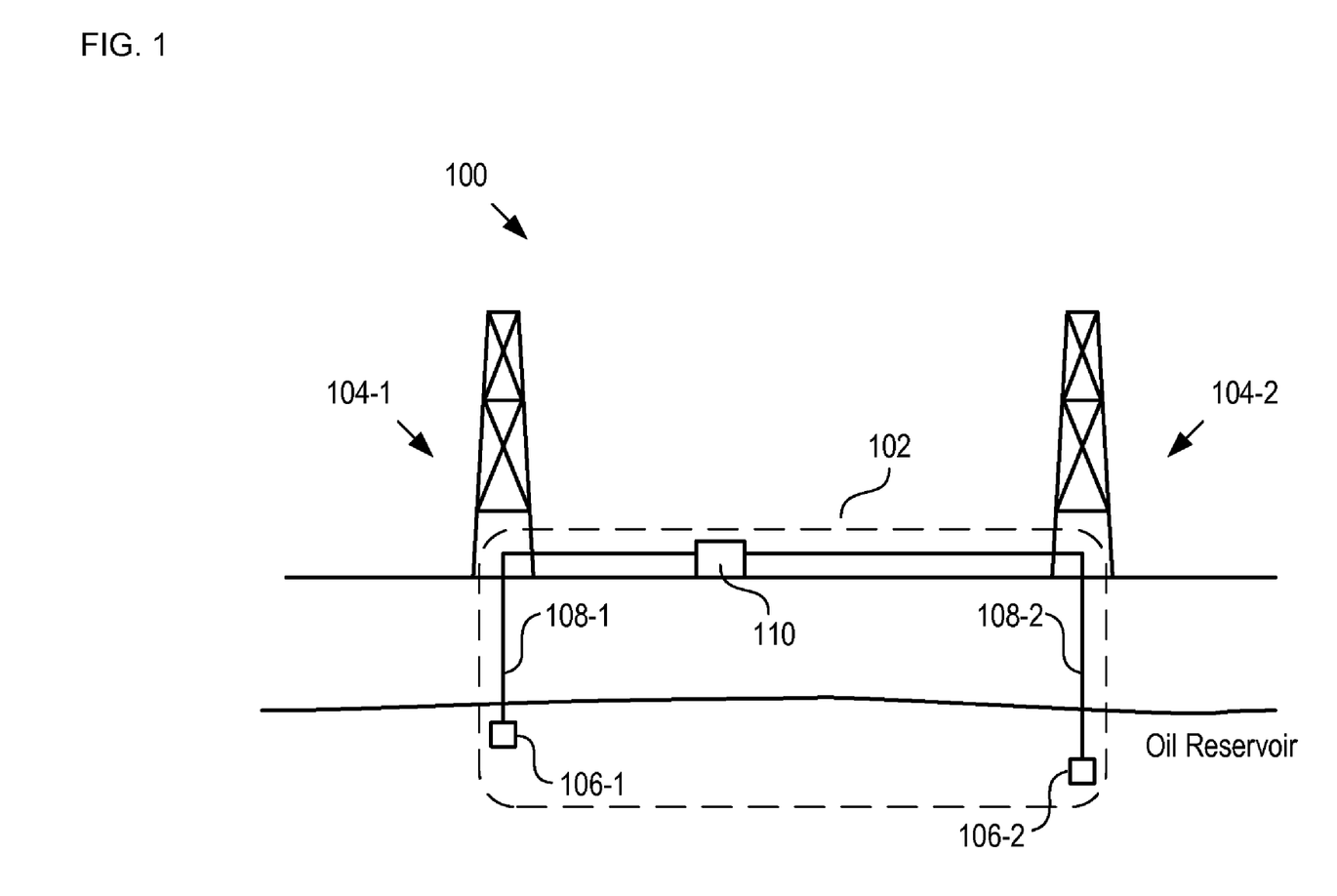
FIG. 1 depicts a schematic diagram of details of an oil field fluid flow measurement system in accordance with an illustrative embodiment of the present invention.

FIG. 1 depicts a schematic diagram of details of an oil field fluid flow measurement system in accordance with an illustrative embodiment of the present invention. Measurement system 100 comprises differential gravimeter 102, and oil wells 104-1 and 104-2.

Gravimeter 102 is a differential gravity measurement system for monitoring fluid movement in the oil field in order to maximize production yield. Gravimeter 102 comprises gravity sensors 106-1 and 106-2, cables 108-1 and 108-2, and controller 110. In order to monitor fluid flow in the oil field, the multiple gravity sensors are inserted directly into the boreholes of oil wells that are distributed around the oil field. Each pair of sensors provides a differential gravity reading between their locations. In total, the sensors provide a measure of the gravity gradient in the oil field, and thus provide an indication of its oil distribution. Gravimeter 102 is described in more detail below and with respect to FIG. 2.

Each of gravity sensors 106-1 and 106-2 provide an optical signal that is reflected from a free-falling test mass contained within it. The optical signals are carried to controller 110 via optical fibers contained in cables 108-1 and 108-2. A change in the relative phase of these two optical signals denotes a difference in the accelerations of the free-falling test masses. This phase information, therefore, denotes a difference in the local gravity experienced by each gravity sensor. Gravity sensors 106-1 and 106-2 are described in detail below and with respect to FIGS. 3-7.

Controller 110 is a processor/controller for: (1) supplying optical signals to gravity sensors 106-1 and 106-2; (2) detecting optical signals reflected from gravity sensors 106-1 and 106-2; and (3) generating an output based on the phase difference between the optical signals reflected from gravity sensors 106-1 and 106-2. Controller 110 is described in more detail below and with respect to FIG. 2.

Figure 2:
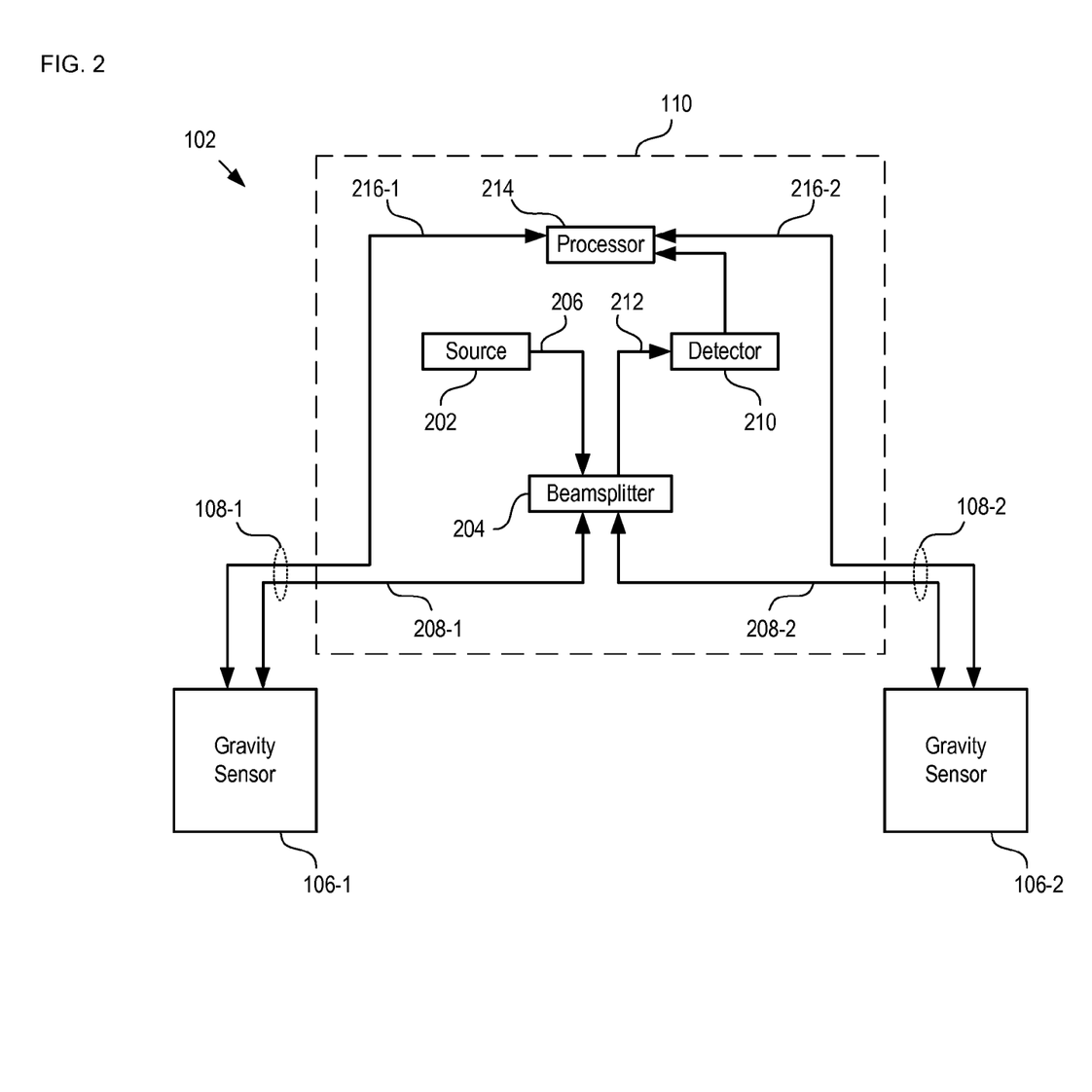
FIG. 2 depicts a schematic diagram of details of a gravimeter in accordance with the illustrative embodiment of the present invention.

FIG. 2 depicts a schematic diagram of details of a gravimeter in accordance with the illustrative embodiment of the present invention. Gravimeter 102 comprises gravity sensors 106-1 and 106-2, and controller 110. Controller 110 comprises a general purpose signal processor as well as optical components that, together with gravity sensors 106-1 and 106-2, form an interferometer for providing differential phase information used by controller 110 to generate its output. Specifically, controller 110 comprises source 202, beamsplitter 204, detector 210, and processor 214.

Source 202 is a source of an optical signal comprising substantially monochromatic light. This light is launched into optical fiber 206, which conveys the light to beamsplitter 204. It will be clear to those skilled in the art how to make and use source 202.

Beamsplitter 204 is a conventional beamsplitter that is positioned as the central component in a Michelson interferometer configuration. Beamsplitter 204 splits optical energy received from optical fiber 206 into two optical signals (which are in-phase), and launches these optical signals into optical fibers 208-1 and 208-2. Beamsplitter 204 also receives optical signals reflected from gravity sensors 106-1 and 106-2. The reflected signals are combined and launched onto optical fiber 212. It will be clear to those skilled in the art how to make and use beamsplitter 204.

Detector 210 is a conventional photodetector which generates an electrical signal based on the intensity of light received from optical fiber 212. Since the signal received by detector 210 is the combined reflected optical signals from gravity sensors 106-1 and 106-2, its electrical output exhibits any effects of the interference of these reflected optical signals. This interference is an indication of any difference in the accelerations of free-falling masses in gravity sensors 106-1 and 106-2, as will be explained below and with respect to FIGS. 4-6. A difference in these accelerations is a function of a difference in gravity between the locations of gravity sensors 106-1 and 106-2. It will be clear to those skilled in the art how to make and use detector 210.

Processor 214 is a general purpose processor that: (1) generates an output signal based on an electrical signal received from detector 210; (2) provides orientation control signals to gravity sensors 106-1 and 106-2; and (3) synchronizes the release of the test masses in gravity sensors 106-1 and 106-2. Although the illustrative embodiment comprises a processor that interfaces with only one pair of gravity sensors, it will be clear to those skilled in the art, after reading this specification, how to make and use alternative embodiments of the present invention wherein processor 214 interfaces with multiple pairs of gravity sensors.

Electrical cables 216-1 and 216-2 are conventional control cables for conveying electrical signals between processor 214 and gravity sensors 106-1 and 106-2, respectively. Electrical cable 216-1 is bundled with optical fiber 208-1 in cable 108-1. In similar fashion, electrical cable 216-2 is bundled with optical fiber 208-2 in cable 108-2.

Figure 3:
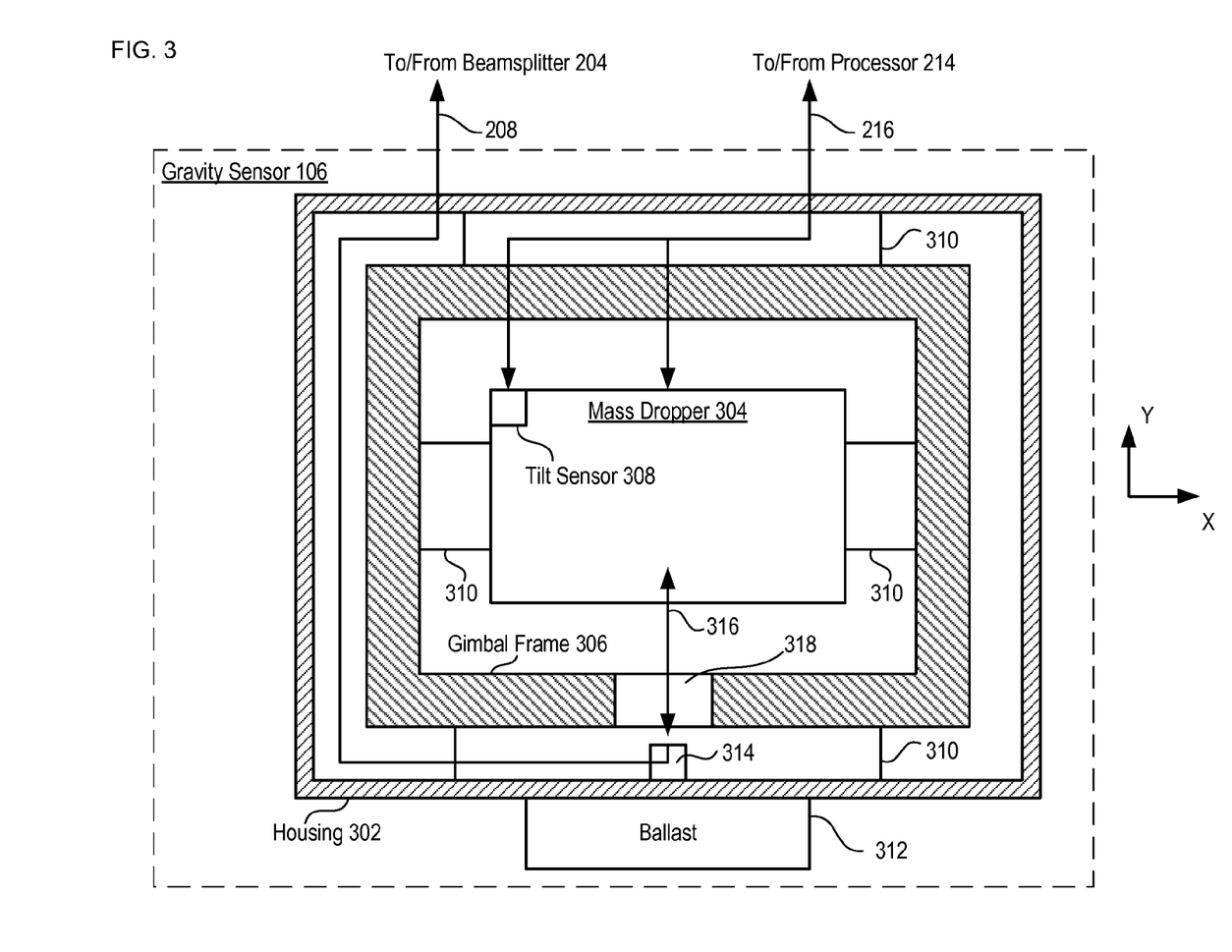
FIG. 3 depicts a schematic diagram of details of a gravity sensor in accordance with the illustrative embodiment of the present invention.

FIG. 3 depicts a schematic diagram of details of a gravity sensor in accordance with the illustrative embodiment of the present invention. Gravity sensor 106 is representative of either of gravity sensors 106-1 and 106-2. Gravity sensor 106 comprises housing 302, mass dropper 304, gimbal frame 306, tilt sensor 308, gimbal actuators 310, ballast 312, and ferrule 314.

Housing 302 is a rigid housing for protecting gravity sensor 106 while it is submerged in the harsh environment of an oil well. It will be clear to those skilled in the art, after reading this specification, how to make and use housing 302.

Mass dropper 304 is a system for dropping a test mass so that its free-fall acceleration can be determined. Optical signal 316, which is transmitted to and reflected from the test mass, is coupled to optical fiber 208 via ferrule 314. Mass dropper 304 will be described below and with respect to FIGS. 4-6.

Gimbal frame 306 is a frame of rigid material that is configured to enable mass dropper 304 to rotate about two orthogonal axes relative to housing 302. Gimbal frame 306 is connected to mass dropper 304 via a first set of gimbal actuators 310, such that mass dropper 304 can rotate about the Y-axis (as shown in FIG. 3) with respect to gimbal frame 306. Gimbal frame 306 is connected to housing 302 via a second set of gimbal actuators 310 which are oriented orthogonally with respect to the first set of gimbal actuators 310. The second set of gimbal actuators enable the rotation of gimbal frame 306 about the X-axis (as shown in FIG. 3) with respect to housing 302. As a result, the first and second set of gimbal actuators 310 enable the rotation of mass dropper 304 about two orthogonal axes with respect to housing 302.

Tilt sensor 308 is a conventional electrolytic tilt sensor that provides an electrical signal based on the tilt of mass dropper with respect to vertical. It will be clear to those skilled in the art, after reading this specification, how to make and use tilt sensor 308. Although the illustrative embodiment comprises an electrolytic tilt sensor, it will be clear to those skilled in the art, after reading this specification, how to make and use alternative embodiments of the present invention wherein tilt sensor 308 comprises other types of tilt sensors having sufficient accuracy. Tilt sensors suitable for use in tilt sensor 308 include, without limitation, accelerometers, MEMS accelerometers, mercury-based tilt switches, rotary encoders, and inertial sensors.

Gimbal actuators 310 are piezoelectric ultrasonic ring motors, which are capable of high-precision rotation. Although in the illustrative embodiment gimbal actuators 310 comprise ultrasonic ring motors, it will be clear to those skilled in the art, after reading this specification, how to make and use alternative embodiments of the present invention wherein gimbal actuators 310 comprise any type of ring motor having sufficient accuracy. Gimbal actuators 310 also comprise slip-ring electrical contacts for providing electrical connectivity between components in mass dropper 304 and electrical cable 216.

Deviation of the orientation of mass dropper 304 from vertical results in errors caused by horizontal components in the gravity sensor output signal. It is desirable, therefore, that the orientation of mass dropper 304 be as close to vertical as possible. For the purposes of this specification, including the appended claims, "vertical" means that orientation that causes a test mass in a mass dropper to fall with no horizontal displacement component (i.e., wherein the mass dropper is "plumb"), and "tilt" means a deviation from vertical. Tilt sensor 308, processor 214, and gimbal actuators 310 constitute a feedback system for minimizing the tilt of mass dropper 304. Processor 214 provides control signals to gimbal actuators 310 to minimize the output of tilt sensor 308.

Ballast 312 is a solid mass of highly-dense material that is located on the underside of house 302. Ballast 312 alters the weight distribution for housing 302 and causes gravity sensor 106 to orient itself in a nearly vertical orientation. The presence of ballast 312, therefore, reduces the amount of travel required of the gimbal actuators 310 to minimize the tilt the gravity sensor. As a result, optical port 318 maintains a rough alignment with ferrule 314 to allow the passage of free-space optical beam 316 through gimbal frame 304. Since ballast 312 serves to keep optical port 318 roughly aligned with ferrule 314, optical fiber 208 needs only a small amount of slack to accommodate the relative motion of mass dropper 306, gimbal frame 304, and housing 302 required to put mass dropper 306 in vertical orientation.

Although in the illustrative embodiment, housing 302 comprises ballast that results in rough alignment of optical port 316 and ferrule 314, some alternative embodiments do not comprise ballast 312. In some alternative embodiments, optical fiber 108 includes a loose coil of optical fiber to accommodate large rotations of mass dropper 306 with respect to housing 302. In some alternative embodiments, free space optical signal 316 is routed from ferrule 314 through gimbal frame 304 and dropper frame 402 via a plurality of mirrors located on the inner surface of gimbal frame 304. It will be clear to those skilled in the art, after reading this specification, how to make and use alternative embodiments of the present invention wherein housing 302 does not comprise ballast.

Ferrule 314 is a conventional fiber optic ferrule for transmitting and receiving optical signal 316 to/from mass dropper 306. Ferrule 314 includes a lens for efficiently coupling free-space optical signal 316 into and out of optical fiber 208. Ferrule 314 also includes a facet having an integrated turning element, such as a mirror, wedge, prism, and the like. In some alternative embodiments, ferrule 314 is not integrated with the turning element. In some alternative embodiments, ferrule 314 is oriented to launch optical signal 316 directly at mass dropper 306 without the need for a turning element.

Figure 4:
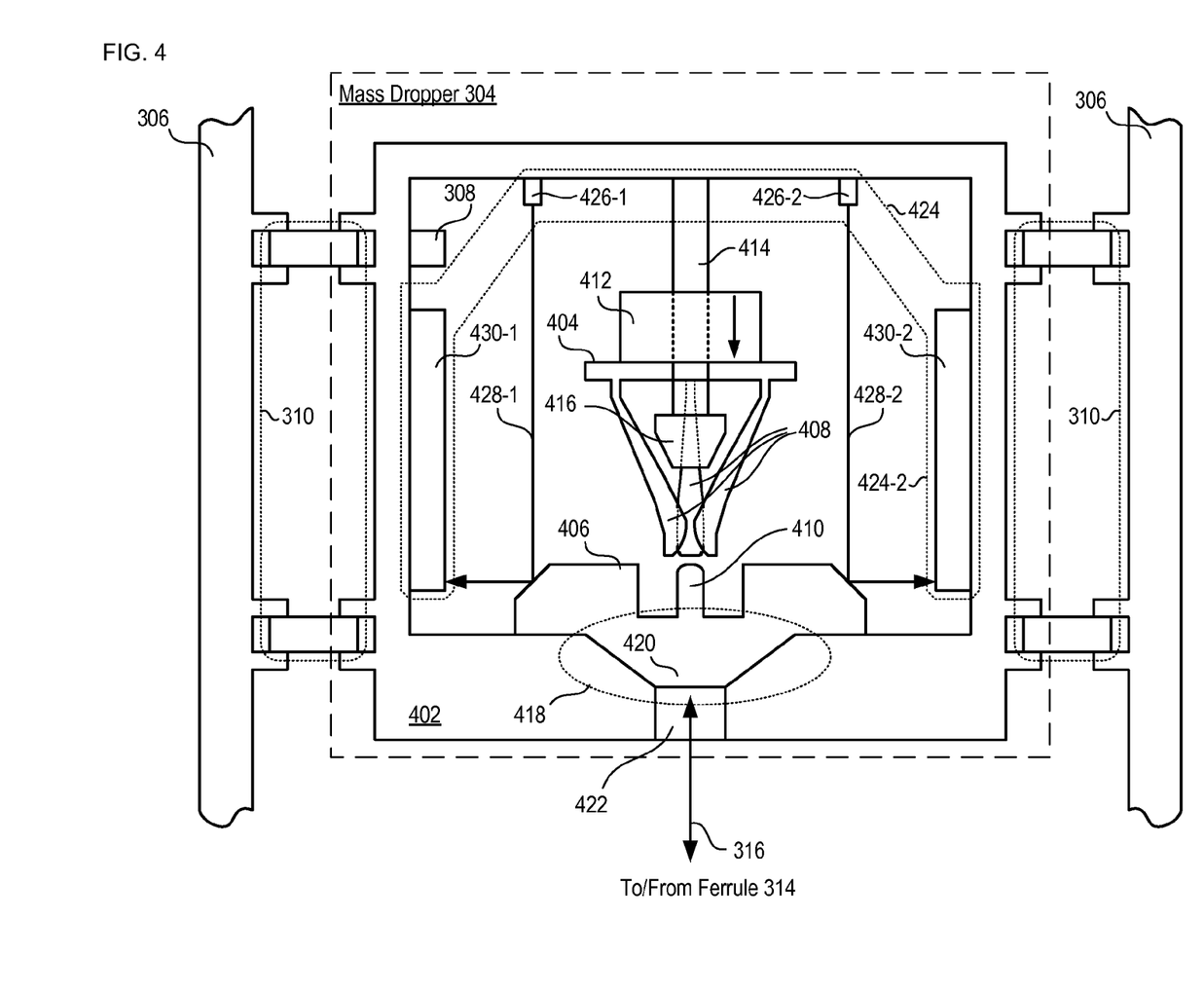
FIG. 4 depicts a cross-sectional diagram of details of a mass dropper, prior to grasping a test mass, in accordance with the illustrative embodiment of the present invention.
Figure 5:
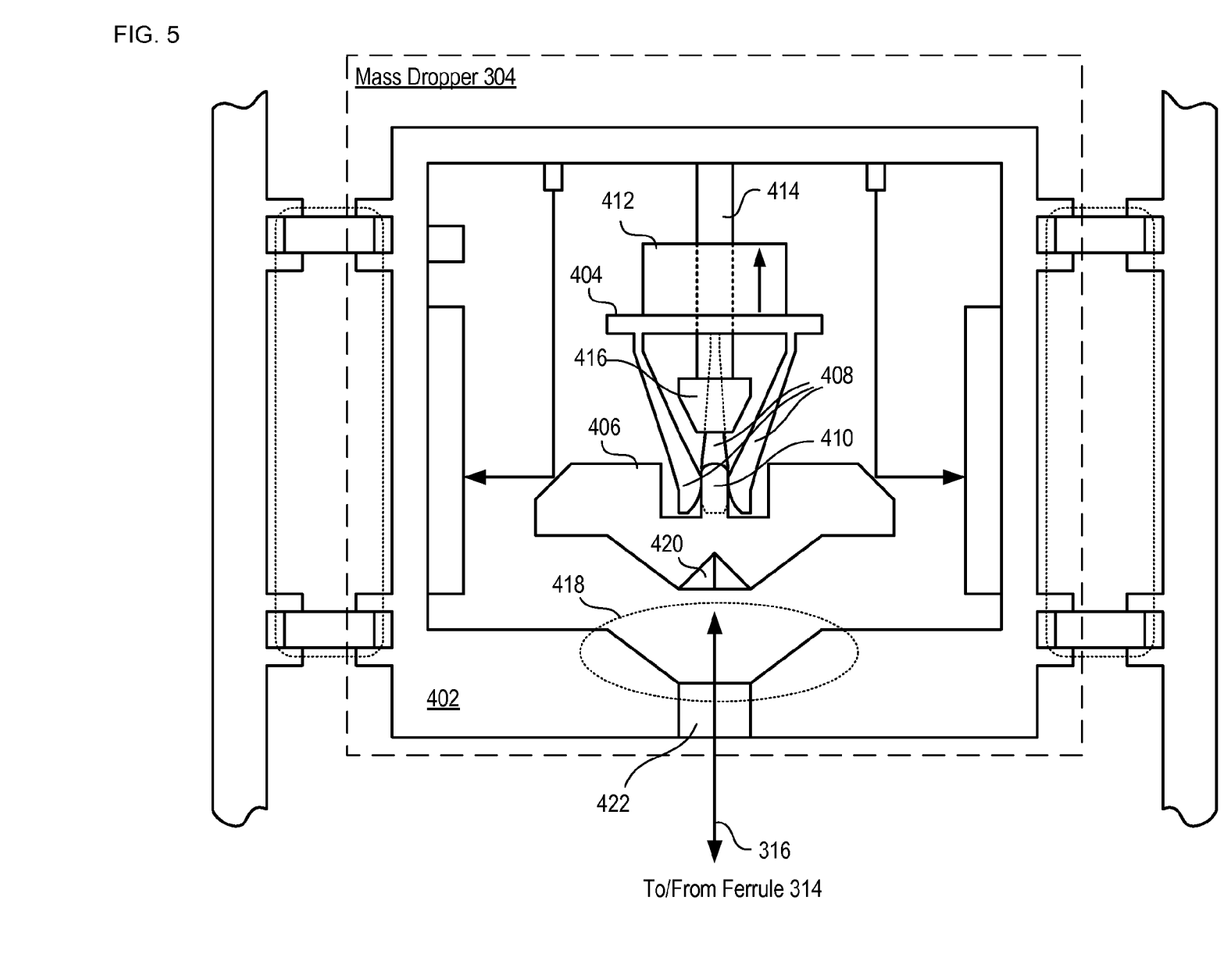
FIG. 5 depicts a cross-sectional view of a mass dropper, after grasping a test mass, in accordance with the illustrative embodiment of the present invention.
Figure 6:
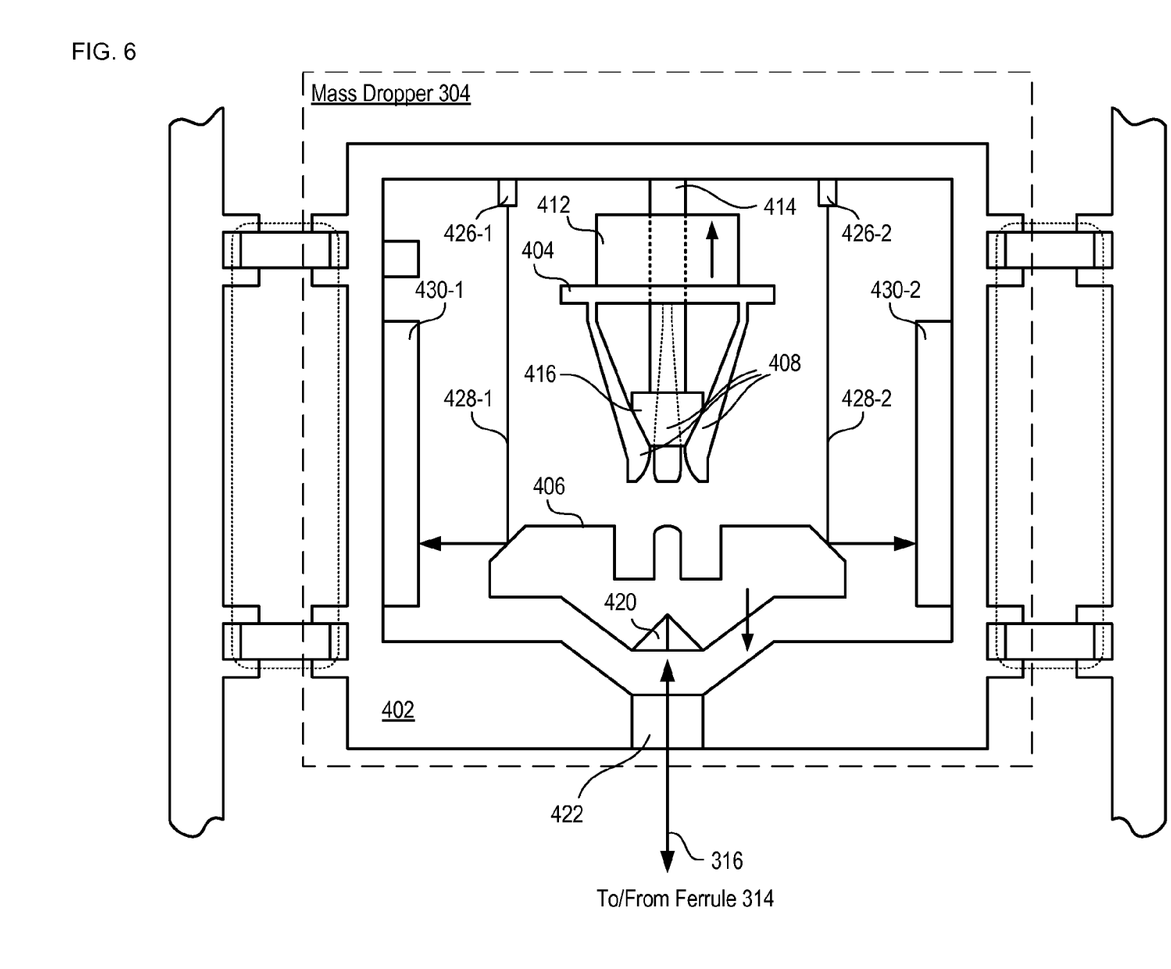
FIG. 6 depicts a cross-sectional view of a mass dropper, after release of a test mass, in accordance with the illustrative embodiment of the present invention.

FIGS. 4-6 depict a cross-sectional diagram of details of a mass dropper: (1) prior to grasping a test mass; (2) after grasping a test mass; and (3) after releasing a test mass, in accordance with the illustrative embodiment of the present invention. Mass dropper 306 comprises dropper frame 402, grasper 404, test mass 406, actuator 412, wedge 416, and seat 418.

Dropper frame 402 is a frame of rigid material that is configured to enable mass dropper 304 to rotate about an axis with respect to gimbal frame 304. Dropper frame 402 is connected to gimbal frame 304 via gimbal actuators 310. Dropper frame 402 also provides a stable platform for positioning grasper 404 and seat 422 such that grasper 404 drops test mass 406 directly into seat 418 when mass dropper 306 is vertically oriented. Dropper frame 402 comprises optical port 422, which enables optical signal 318 to interrogate test mass 406 throughout its entire range of travel.

Grasper 404 is a rigid platform having a plurality of tangs 408 projecting from one face. Together, tangs 408 compose a pincer for passively engaging catch 410 of to grasp test mass 406. Tangs 408 are made of a resilient material, and thus generate a restoring force when forced apart by catch 410. When grasper 404 is moved into engagement with test mass 406 by actuator 412, the top of catch 410 forces tangs 408 to separate. As grasper 404 is moved into further engagement with test mass 406, tangs 408 spread over catch 410. The restoring force generated within tangs 408 causes grasper 404 to grasp test mass 406. Tangs 408 exert a substantially uniformly-distributed force on the outer surface of catch 410. Uniform distribution of the grasping force on catch 410 results in a smooth release of test mass 406 when grasper 404 releases it. As a result, grasper 404 does not induce substantial rotation of test mass 406 as it drops. Although in the illustrative embodiment grasper 404 comprises four tangs, it will be clear to those skilled in the art, after reading this specification, how to make and use alternative embodiments of the present invention wherein grasper 404 comprises any number of tangs.

Test mass 406 is a circular mass having a shaped bottom surface for mating with seat 418. Test mass 406 comprises catch 410 and retroreflector 420. Its shaped bottom surface ensures that test mass 406 will locate in seat 418 in substantially the same orientation each and every time that test mass 406 is dropped. Retroreflector 420 reflects free-space optical signal 316 on a return path parallel to, and preferably coincident with, its path to test mass 406 from ferrule 314.

Actuator 412 is a linear actuator that is affixed to grasper 404. Actuator 412 moves grasper 404 along shaft 414 from a first position, in which grasper 404 grasps catch 410, to a second position, in which grasper 404 releases catch 410. Actuator 412 comprises a conventional MEMS-based inchworm actuator, which is capable of high-precision motion along shaft 414. Actuator 412 will be discussed in more detail below and with respect to FIG. 7. Although the illustrative embodiment comprises an inch-worm linear actuator, it will be clear to those skilled in the art, after reading this specification, how to make and use alternative embodiments of the present invention wherein actuator 412 comprises other linear actuators. Suitable actuators for use in actuator 412 include, without limitation, solenoids, electromagnetic linear motors, lead screw systems, and the like.

Shaft 414 is a steel shaft suitable for use with actuator 412. Shaft 414 includes two flats (not shown) on opposite sides. These flats provide a larger contact surface for actuator 412. In some alternative embodiments, shaft 414 does not include flats.

Wedge 416 is a conical projection attached to the free end of shaft 414. The shape of wedge 416 is suitable for smoothly engaging tangs 408 thereby causing their separation. The diameter of wedge 416 is slightly larger than the diameter of catch 410 to ensure that tangs 408 release catch 410 when they are sufficiently engaged with wedge 416.

Seat 418 is a recess in dropper frame 402. Seat 418 is shaped to accept test mass 406 such that test mass 406 locates in substantially the same position and orientation after each drop by grasper 404. Seat 418 further comprises optical port 422, which provides access to retroreflector 420 for optical beam 316.

Errors in the output of a gravity sensor can arise from sources such as tilt of the mass dropper, component misalignments, and Coriolis forces caused by the Earth's rotation. In order to mitigate some of the effects of at least some error sources, a post-drop correction can be applied based on the measured rotation of test mass 406 as it free-falls. Mass dropper 304, therefore, includes an optional rotation sensor, which communicates with processor 214 via electrical cable 216.

Rotation sensor 424 comprises laser diodes 426-1 and 426-2 and position-sensitive detectors (PSDs) 430-1 and 430-2. Laser diode 426-1 reflects light beam 428-1 off of test mass 406 to PSD 430-1. In similar fashion, laser diode 426-2 reflects light beam 428-2 off of test mass 406 to PSD 430-2. If test mass 406 has not rotated with respect to mass dropper 304 (such as when located in seat 418), PSDs 430-1 and 430-2 receive light beams 428-1 and 428-2 at the same elevation. The output voltage of each PSD, therefore, will be the same. If, during its free-fall, test mass 406 has rotated with respect to mass dropper 304, PSDs 430-1 and 430-2 will receive light beams 428-1 and 428-2 at different elevations. As a result, the outputs of PSDs 430-1 and 430-2 will differ as a function of the degree of rotation of test mass 406. Although in the illustrative embodiment rotation sensor 424 comprises position-sensitive detectors, it will be clear to those skilled in the art, after reading this specification, how to make and use alternative embodiments of the present invention wherein rotation sensor 424 comprises any detector whose output is a function of received beam location, such as charge-coupled-device (CCD) strip detectors, photodetector arrays, and the like. It will also be clear to those skilled in the art, after reading this specification, how to make and use alternative embodiments of the present invention wherein rotation sensor 424 comprises sources of optical energy other than laser diodes. Since the output of each of PSD 430-1 and 430-2 is indicative of the position of mass 406 along its direction of travel, in some embodiments, one or both of PSD 430-1 and 430-2 is used to indicate when mass 406 nears seat 418. In other words, in such embodiments, rotation sensor 424 is also a proximity sensor.

FIG. 5 depicts a cross-sectional view of a mass dropper, after grasping a test mass, in accordance with the illustrative embodiment of the present invention. Once grasper 404 has grasped test mass 406, actuator 412 moves grasper 404 upward toward wedge 416. Tangs 408 are designed to exert evenly-distributed pressure on catch 410 so that no rotation of test mass 406 occurs as it is lifted by grasper 404.

FIG. 6 depicts a cross-sectional view of a mass dropper, after release of a test mass, in accordance with the illustrative embodiment of the present invention. Grasper 404 has engaged wedge 416, which forces tangs 408 to separate. The separation of tangs 408 causes grasper 404 to smoothly release test mass 404, which allows test mass 404 to begin its free-fall without induced horizontal velocity components or rotation. Free-space optical beam 316 interrogates test mass 406 during its free-fall via retroreflector 420. Reflected optical signal 316 is coupled into optical fiber 208 via ferrule 314. As test mass 406 falls, rotation sensor 424 monitors its rotation via light beams 428-1 and 428-2.

Figure 7:
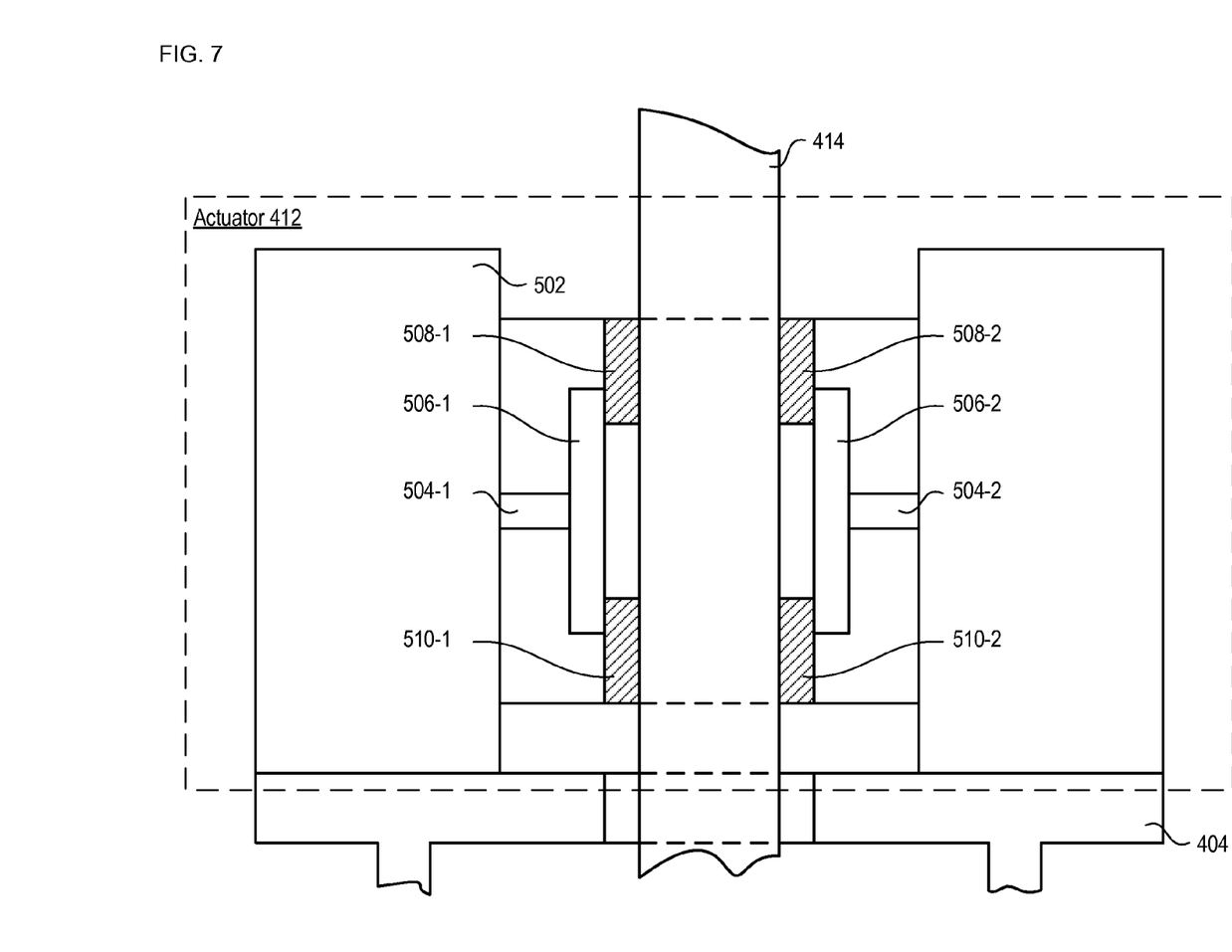
FIG. 7 depicts a cross-sectional view of an actuator in accordance with the illustrative embodiment of the present invention.

FIG. 7 depicts a cross-sectional view of an actuator in accordance with the illustrative embodiment of the present invention. Actuator 412 comprises body 502, couplings 504-1 and 504-2 (referred to, collectively, as couplings 504), elongation elements 506-1 and 506-2 (referred to, collectively, as elongation elements 506), upper contact pads 508-1 and 508-2 (referred to, collectively, as upper pads 508), and lower contact pads 510-1 and 510-1 (referred to, collectively, as lower pads 510).

Body 502 is a ring of rigid material and couplings 504 are bars of rigid material that couple grasper 404 to the elongation elements 506. Suitable materials for body 502 and couplings 504 include, without limitation, metals, ceramics, plastics, and carbon-based materials.

Elongation elements 506 are bars of piezoelectric material that elongate along their longitudinal axis energized with sufficient voltage.

Upper pads 508 and lower pads 510 are pads of piezoelectric material whose contact surface has a coefficient of friction with outer surface of shaft 414 suitable for clamping shaft 414 without slipping. When energized with sufficient voltage, upper pads 508 clamp shaft 414. In similar fashion, when energized with sufficient voltage, lower pads 510 clamp shaft 414.

Actuator 412 is capable of high-precision motion along shaft 414. Actuator 412 moves upward along shaft 414 by means of a voltage cycle comprising the steps: (1) energizing lower pads 510; (2) de-energizing upper pads 508; (3) energizing elongation elements 506 to increase the separation between lower pads 510 and upper pads 508; (4) energizing upper pads 508; (5) de-energizing lower pads 510; and (6) de-energizing elongation element 506 to reduce the separation between lower pads 510 and upper pads 508. Motion downward along shaft 414 is accomplished in similar fashion with the appropriate change in the sequence of steps above.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. An apparatus comprising:
    a mass dropper comprising;
        (i) a first test mass;
        (ii) a grasper, wherein said grasper passively grasps said first test mass when in a first position, and wherein said grasper releases said first test mass when in a second position; and
        (iii) an actuator for moving said grasper on a path that includes said first position and said second position;
    a sensor for providing a first signal based on an orientation of said mass dropper with respect to vertical; and
    a gimbal for controlling the orientation of said mass dropper.

2. The apparatus of claim 1 further comprising an optical system for providing an output signal based on the acceleration of said first test mass after its release.

3. The apparatus of claim 2 wherein said output signal is based on the relation of: (1) the phase of a first optical signal reflected from said first test mass and (2) the phase of a second optical signal reflected from a second test mass.

4. The apparatus of claim 3 further comprising a synchronizer for substantially synchronizing the release of said first test mass and the release of said second test mass.

5. The apparatus of claim 1 wherein said mass dropper further comprises a proximity sensor for providing a second signal based on the position of said actuator on said path.

6. The apparatus of claim 1 wherein said mass dropper further comprises a wedge, and wherein said wedge causes said grasper to release said first test mass when said grasper is in said second position.

7. The apparatus of claim 1 wherein said actuator comprises a linear motor.

8. The apparatus of claim 1 wherein said actuator comprises an inchworm motor.

9. The apparatus of claim 1 wherein said first mass dropper further comprises a rotation sensor for sensing a rotation of said first test mass.

10. An apparatus comprising:
    (1) a first mass dropper, wherein said first mass dropper comprises;
        (i) a first test mass;
        (ii) a first grasper, wherein said first grasper grasps said first test mass when said first grasper is in a first position, and wherein said first grasper does not grasp said first test mass when said first grasper is in a second position;
        (iii) a first actuator for moving said first grasper on a first path that includes said first position and said second position; and
    (2) a first gimbal for orienting said first mass dropper in a substantially vertical orientation;
    (3) a second mass dropper, wherein said second mass dropper comprises;
        (i) a second test mass;
        (ii) a second grasper, wherein said second grasper grasps said second test mass when said second grasper is in a third position, and wherein said second grasper does not grasp said second test mass when said second grasper is in a fourth position;
        (iii) a second actuator for moving said second grasper on a second path that includes said third position and said fourth position; and
    (4) a second gimbal for orienting said second mass dropper in a substantially vertical orientation; and
    (5) an optical system, wherein said optical system provides an output signal based on the phases of a first optical signal and a second optical signal, wherein said first optical signal is reflected from said first test mass and said second optical signal is reflected from said second test mass.

11. The apparatus of claim 10 further comprising a first wedge and a second wedge, wherein said first wedge causes said first grasper to release said first test mass when said first grasper is moved to said second position, and wherein said second wedge causes said second grasper to release said second test mass when said second grasper is moved to said fourth position.

12. The apparatus of claim 11 further comprising a synchronizer, wherein said synchronizer synchronizes the release of said first test mass and the release of said second test mass.

13. The apparatus of claim 10 wherein said first grasper comprises a plurality of tangs, and wherein said plurality of tangs engages and grasps said first test mass when said first grasper moves to said first position, and further wherein said first wedge separates said tangs to release said first test mass when said first grasper moves to said second position.

14. The apparatus of claim 10 further comprising a first sensor, wherein said first sensor provides a signal based on an orientation of said first mass dropper with respect to vertical.

15. The apparatus of claim 14 wherein said first sensor comprises an accelerometer.

16. The apparatus of claim 14 wherein said first sensor comprises an electrolytic tilt sensor.

17. The apparatus of claim 10 wherein said first actuator comprises a linear actuator.

18. The apparatus of claim 10 wherein said first actuator comprises an inchworm motor.

19. The apparatus of claim 10 wherein said first actuator comprises a lead screw.

20. The apparatus of claim 10 wherein said first mass dropper further comprises a rotation sensor for sensing a rotation of said first test mass.

* * * * *